United States Patent [19]
Bliton et al.

[11] Patent Number: 5,260,578
[45] Date of Patent: Nov. 9, 1993

[54] CONFOCAL IMAGING SYSTEM FOR VISIBLE AND ULTRAVIOLET LIGHT

[75] Inventors: Allison C. Bliton, Okemos, Mich.; David E. Clapham, Rochester, Minn.; James D. Lechleiter, Gordonsville, Va.

[73] Assignee: Mayo Foundation for Medical Education and Research, Rochester, Minn.

[21] Appl. No.: 877,614

[22] Filed: Apr. 30, 1992

Related U.S. Application Data

[63] Continuation-in-part of Ser. No. 683,428, Apr. 10, 1991, abandoned.

[51] Int. Cl.⁵ ............... G01N 21/64; G02B 21/16
[52] U.S. Cl. .................. 250/461.1; 250/461.2; 359/350; 359/368
[58] Field of Search ........... 250/461.1, 461.2, 372, 250/458.1; 359/368, 197, 350

[56] References Cited

U.S. PATENT DOCUMENTS

| | | | |
|---|---|---|---|
| 3,598,471 | 8/1971 | Baldwin et al. | 350/162 |
| 4,656,358 | 4/1987 | Divens et al. | 250/372 |
| 4,863,226 | 9/1989 | Houpt et al. | 350/6.5 |
| 4,893,008 | 1/1990 | Horikawa | 250/234 |
| 5,032,720 | 7/1991 | White | 250/236 |
| 5,034,613 | 7/1991 | Denk et al. | 250/459.1 |
| 5,091,652 | 2/1992 | Mathies et al. | 250/458.1 |

Primary Examiner—Carolyn E. Fields
Attorney, Agent, or Firm—Townsend and Townsend Khourie and Crew

[57] ABSTRACT

A scanning confocal microscope (50) capable of providing ultraviolet (UV) excitation. The optical train substantially corrects scanning and focusing errors over the wavelength range that includes UV and visible wavelengths. In a particular embodiment, the lenses (27, 30') in the common path portion of the optical train are corrected for chromatically induced scanning errors while extra lenses (60, 65) are provided in the forward UV path to correct for focusing errors due to longitudinal chromatic (visible/UV) aberration.

18 Claims, 8 Drawing Sheets

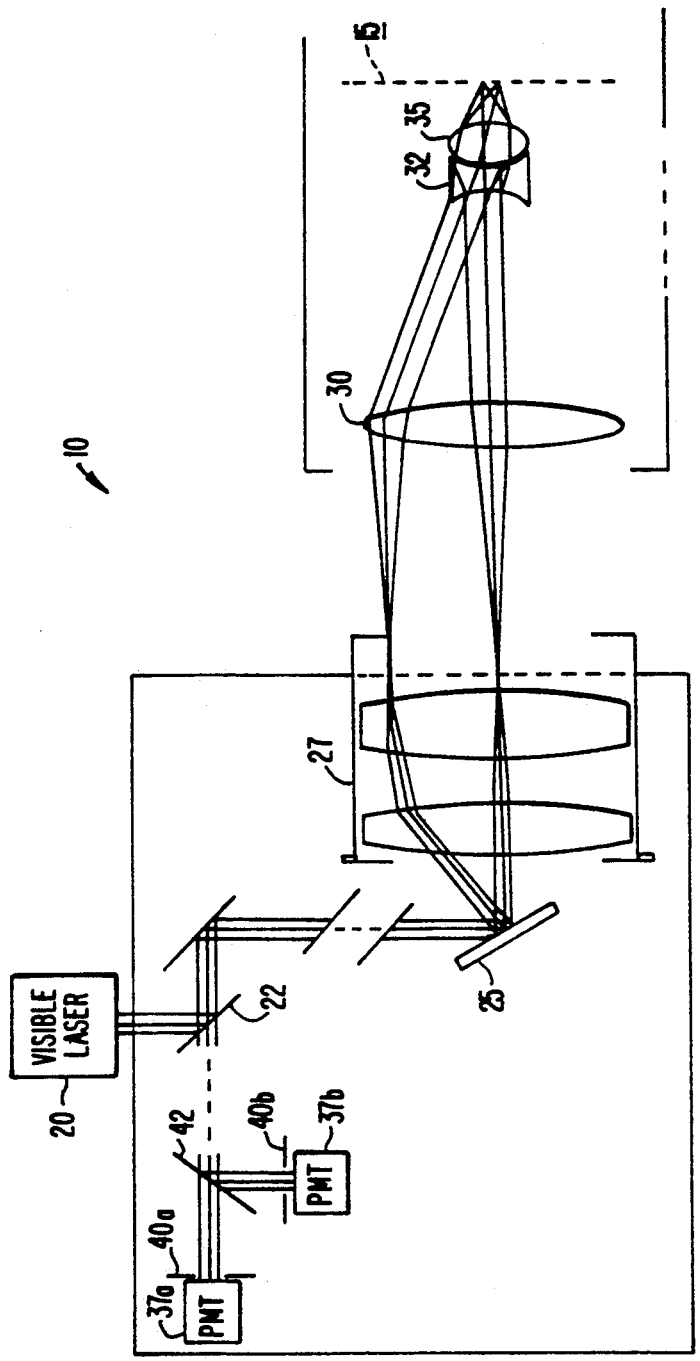
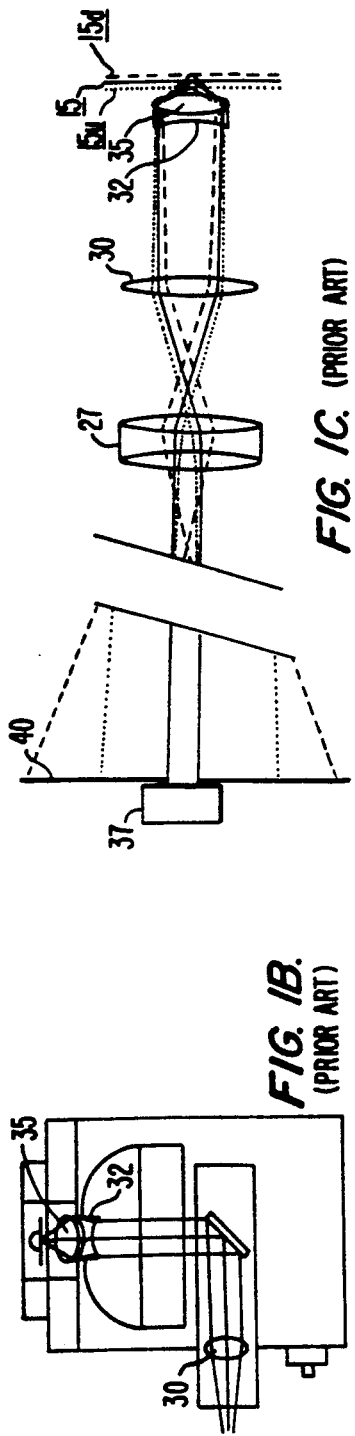
FIG. 1A. (PRIOR ART)
FIG. 1B. (PRIOR ART)
FIG. 1C. (PRIOR ART)

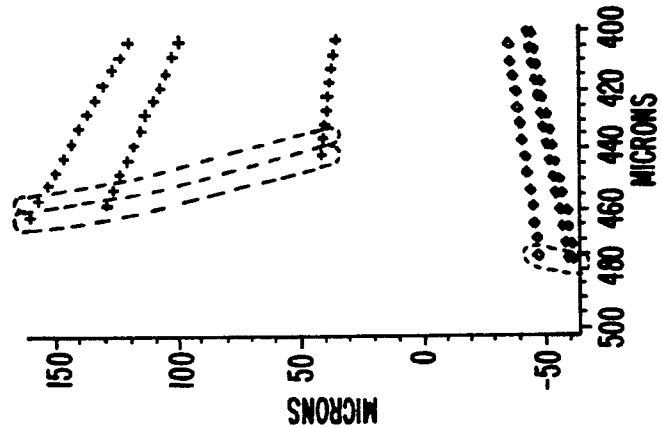
FIG. 12C.
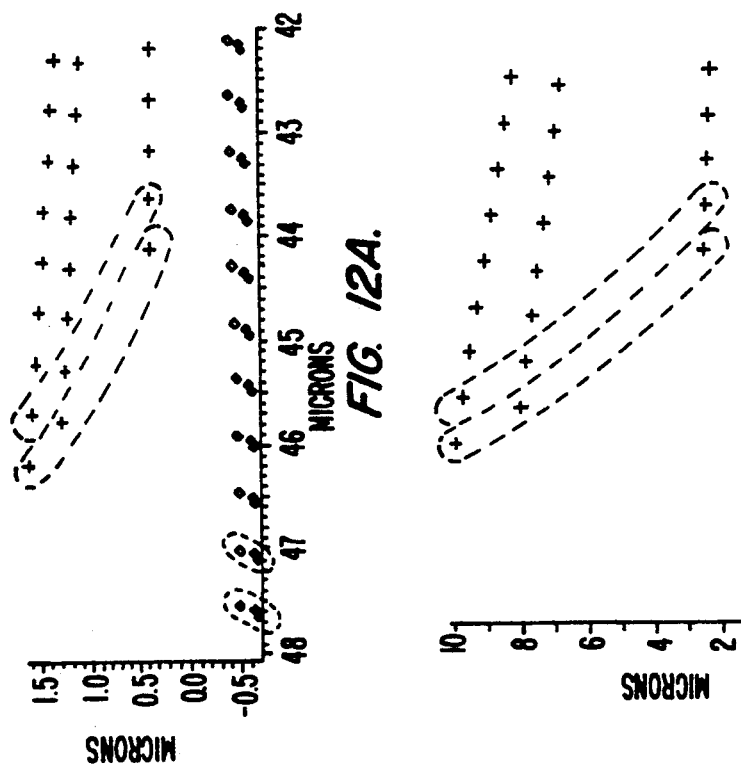
FIG. 12A.
FIG. 12B.

CONFOCAL IMAGING SYSTEM FOR VISIBLE AND ULTRAVIOLET LIGHT

This is a continuation-in-part of U.S. patent application Ser. No. 07/683428, filed Apr. 10, 1991, now abandoned.

BACKGROUND OF THE INVENTION

This invention relates generally to confocal microscopy and more specifically to a confocal scanning microscope usable with visible and ultraviolet (UV) light.

Fluorescent light microscopy is extensively used in biological research and medical diagnosis. It provides the selectivity necessary to enable specific components of a cell or tissue to be visualized and the spatial organization of such components to be determined. Confocal microscopy operates so that illumination and detection are confined to a single point in the sample. This is typically achieved by using spatial filters (usually pinholes) in the optical paths of the objective and condenser, and a complete image is built up by sequentially scanning all points in the field of view.

A particular confocal microscope is shown in U.S. Pat. No. 5,032,720, the disclosure of which is incorporated by reference. The microscope produces a small (preferably diffraction limited) spot on a sample, scans the spot over the sample in a raster pattern, and generates an electrical signal proportional to the intensity of light emanating and collected from the region of the spot. The electrical signal is communicated to a computer which can produce a visual display on the monitor.

The optical train between the source (or detector) and the sample comprises focusing optics to form the spot and scanning elements to scan the beam in two orthogonal directions to form the raster pattern on the sample. The light emanating from the sample passes along a return path to a detector, which generates the electrical signal. An aperture in the form of an iris diaphragm is disposed in front of the detector and blocks light that emanated from points spatially displaced from the beam spot.

A confocal microscope accessory for use in combination with a conventional microscope has been marketed under the trade designations MRC-500 and MRC-600 by Bio-Rad Laboratories, Inc., Hercules, California. The resulting confocal microscope provides a visible excitation beam and senses fluorescence in the visible range.

SUMMARY OF THE INVENTION

The present invention provides a scanning confocal microscope capable of providing ultraviolet (UV) excitation. The optical train substantially corrects scanning and focusing errors over the wavelength range that includes UV and visible wavelengths.

In brief, the confocal scanning microscope according to the present invention includes a UV excitation source and UV-transmissive scanning and imaging optics. The UV light is directed along a forward path and focused to a small spot in a sample plane. Light emanating from the region of the spot is directed along a return path and detected. Light emanating from points spatially displaced from the spot is rejected by the detector aperture. The beam spot is scanned over the sample in a raster pattern. Where the returning light is visible (as for example when it is desired to detect visible fluorescence), the optical train must be made confocal for both the visible and UV light. This also makes it possible to provide simultaneous UV and visible excitation.

In a particular embodiment, the lenses in the common path portion of the optical train are corrected for chromatically induced scanning errors while extra lenses are provided in the forward UV path to correct for focusing errors due to longitudinal chromatic (visible/UV) aberration. Separating out the correction of scanning errors and focusing errors makes it easy to accommodate different objectives that vary in their degree of longitudinal chromatic aberration.

A further understanding of the nature and advantage of the present invention can be realized by reference to the remaining portions of the specification and the drawings.

BRIEF DESCRIPTION OF THE DRAWINGS

FIGS. 1A and 1B are simplified optical schematics of a prior art confocal microscope;

FIG. 1C is an optical sketch illustrating proper confocal operation;

FIGS. 12A-C are plots illustrating the effect and correction of field curvature and magnification errors.

DESCRIPTION OF SPECIFIC EMBODIMENTS

Prior Art Visible Confocal Microscope

Figure 2:
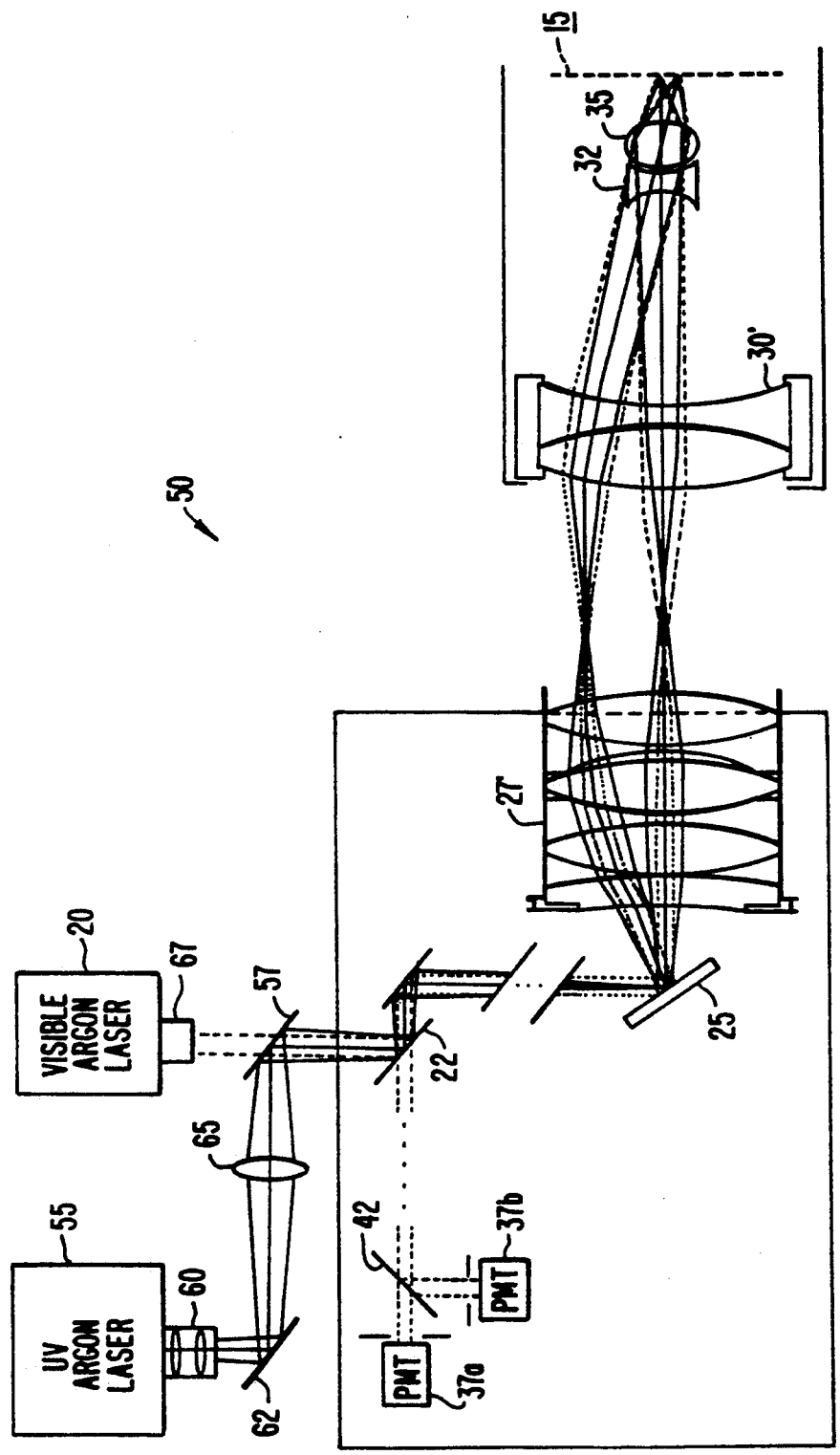
FIG. 2 is a simplified optical schematic of an inverted microscope embodiment of the present invention.

FIG. 1A is a simplified optical schematic of a prior art scanning confocal microscope 10. The particular prior art confocal microscope discussed here and the confocal microscope as modified according to the present invention is a Bio-Rad MRC-600 accessory used in combination with a conventional microscope. The term "microscope" will typically be used to mean the scanning confocal microscope resulting from the combination.

The microscope operates to focus a beam of visible light to a point in a sample plane 15, and to detect light (reflected light and fluorescence) emanating from the point in the sample plane. To this end, the microscope includes a visible light source 20 such as an argon ion laser whose beam is directed along a forward path through an optical train comprising a beam splitter 22, scanning optics 25, an eyepiece 27, an adapter lens 30, an infinity-correcting lens 32 (referred to as telon lens 32), and an objective 35. Beam splitter 22 is formed of a dichroic material that reflects the visible excitation beam but transmits light in the range of wavelengths characteristic of the fluorescence from the sample. The objective and eyepiece focus the beam to form a small spot nominally in the sample plane.

Light emanating from the region of the spot travels along a return path until it reaches beam splitter 22, from which point it passes through and is directed to a detector 37a such as a photomultiplier tube (PMT). An aperture 40a, preferably an iris diaphragm (variable diameter 0.7–7.0 mm), is disposed in front of the detector. A dichroic beam splitter 42 may be disposed in the return-only path to direct light in one wavelength range to detector 37a and light in a different wavelength range to a second detector 37b and associated aperture 40b.

The optical path from the scanning optics assembly to the detector is folded by means of a number of plane steering mirrors in order to provide a relatively long path length. The scanning optics comprises a pair of galvanometer-driven plane mirrors with relay optics, preferably a pair of facing concave mirrors, therebetween. The first scanning mirror scans the beam in a plane perpendicular to that of the figure while the second scanning mirror scans the beam in the plane of the figure. Only the second scanning mirror is shown in the schematic.

The last scanning mirror is placed near the front focal plane of the eyepiece so that the beams travel from the eyepiece to the adapter lens generally parallel to the optic axis, regardless of scan angle. The collimated laser beam is focused to the back focal plane of the eyepiece; the microscope is located relative to the confocal accessory so that the front focal plane of the adapter lens coincides with the eyepiece back focal plane.

The particular embodiment illustrated is for an inverted microscope where the optical path between the eyepiece and the objective is longer than the distance for that which eyepieces and objectives are normally designed. An extra detail view is shown in FIG. 1B. Most objectives are corrected to receive incoming light as if it were coming from a point source 160 mm away. Telon lens 32 cooperates with the objective so that the combination of the two is corrected for incoming parallel light (i.e., is infinity corrected). In a complementary manner, the adapter lens (which is basically a 160 mm achromat) cooperates with the eyepiece to provide parallel light. Thus adapter lens 30 and telon lens 32 operate as a type of a relay optics. In an upright microscope embodiment (not illustrated), the adapter lens and telon lens are absent.

It is sometimes convenient to consider the upstream elements (eyepiece and possible adapter lens) as a unit and the downstream elements (possible telon lens and objective) as a unit. The use of an eyepiece, a long return path, and a collimated return beam allows confocal operation to be achieved without pinhole spatial filters.

For purposes of discussion, it is convenient to divide the optical paths into a number of segments. The term "forward-only" will refer to the path segment from the light source to beam splitter 22 over which only excitation light travels. The term "common path segment" will refer to the optical path between the beam splitter and the sample plane over which light travels in both directions. The term "return-only" will refer to the path segment between the beam splitter and the detector, over which only light returning from the sample travels. References to the front surface of a lens will be taken to mean the surface that is first encountered by the light on the forward path while references to the back surface will be taken to mean the surface that is first encountered by the light on the return path.

Confocal Operation

FIG. 1C shows how light emerging from the region of the beam spot in sample plane 15 passes back through the optical system along the return path and passes to the detector. The figure also shows how light diverging from points in a pair of planes 15u and 15d displaced upstream and downstream, respectively, from the sample plane is rejected by the aperture. Sample plane 15 is drawn as a solid line, and the light emanating from a point in plane 15 is drawn as solid lines. Planes 15u and 15d are drawn in two styles of broken lines, and the light emerging from those planes is drawn correspondingly. As can be seen, the light emerging from downstream plane 15d is refocused by the lenses and diverges while the light emerging from upstream plane 15u is diverging when it leaves the lenses. In both cases, the beams have diverged greatly by the time they reach the aperture plane and are largely rejected by the aperture.

The above description is subject to a slight qualification. To the extent that light from sample plane is collimated by the optics, light emanating from a plane very slightly downstream (not as far downstream as plane 15d) is actually focused into the aperture. What this means is that the light reaching the detector includes a small component that is not confocal with the excitation light. The effect can be avoided by placing a long lens (say 1000 mm) in the return-only path so that it focuses the collimated (confocal) beam into the aperture and causes the light from slightly downstream to be diverging when it reaches the aperture. This will be discussed in greater detail below.

UV Confocal Microscope Embodiments

FIG. 2 is a simplified optical schematic of a confocal microscope 50, modified according to the present invention so that both visible and UV light can be used for excitation. Elements that are the same as those in FIG. 1A will have the same reference numerals, corresponding elements that are modified will have primed reference numerals, and elements that have no counterpart in FIG. 1A will have different reference numerals. As above, an inverted microscope embodiment is illustrated.

Confocal operation as described in connection with the prior art visible microscope does not naturally extend into the realm of UV excitation, much less so when it is desired to provide visible excitation as well. The first obvious problem is that eyepiece 27 does not transmit UV light and adapter lens 30 transmits it poorly. However, even if the lenses transmit UV, a number of aberrations must be corrected for proper operation to occur. The design details for both inverted and upright microscope embodiments are described (and illustrated where appropriate) below.

A UV laser 55 provides a UV beam that is combined with the visible beam from visible laser 20 by a beam combiner 57 (which is a visible/UV dichroic reflector). A focusing UV (5×) beam expander 60, steering mirrors 62, and a UV correction lens 65 are interposed between UV laser 55 and beam combiner 57. To the extent that beam splitter 22 does not reflect UV light, it must be modified so that it reflects both the visible and UV laser beams but transmits the visible fluorescence. The microscope is further modified by being provided a specially designed eyepiece 27' and adapter lens 30', to be described below. The characteristics of beam splitter 42 may be selected in view of the visible wavelengths to be separated.

Focusing UV beam expander 60 provides magnification to allow filling the back aperture of the objective sufficiently to obtain maximum resolution. The use of a confocal microscope reduces the smallest detectable distance between spots to 0.707 times the smallest distance detectable by a conventional microscope. The use of UV excitation improves the resolution relative to that obtainable with visible excitation due to the shorter wavelength.

A visible beam expander 67 is preferably disposed between visible laser 20 and beam combiner 57, and provides 1.5×-2× magnification to allow the visible excitation beam to fill the back aperture of the objective. This is necessary since UV eyepiece 27' has a lower magnification than visible eyepiece 27 (about 6.4× versus 8×). In view of the reduced magnification, consideration is being given to reducing the minimum aperture diameter from 0.7 mm to 0.5 mm.

UV correction lens 65 is preferably a 500 mm lens that focuses the UV excitation light to a point in front of the eyepiece, from which point it diverges. As noted above, the visible excitation light is generally collimated until it reaches the eyepiece. The UV light is caused to diverge so as to correct for longitudinal chromatic aberration effects in the downstream lens elements. As will be discussed in more detail below, there are chromatic scanning effects that must be corrected in the eyepiece and adapter lens, and the correction of those tends to make it difficult to correct for longitudinal chromatic aberration as well.

The position of the UV correction lens along the optical axis can be adjusted, either alone or in conjunction with refocusing of the beam expander in order to adjust for different amounts of longitudinal chromatic aberration in different objectives while maintaining appropriate filling of the back aperture of the objective. This is a relatively necessary option since objective chromatic aberrations vary significantly in the UV, and back aperture sizes vary significantly with different objectives.

First-Generation Lens Designs

Figure 3:
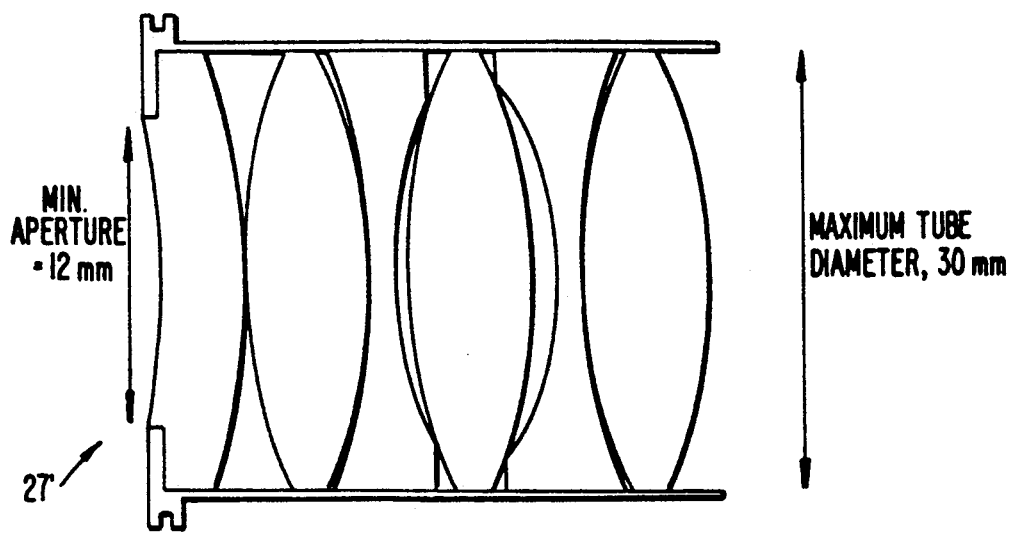
FIGS. 3 and 4 are optical schematics of a first-generation eyepiece and adapter lens for the inverted microscope embodiment.
Figure 4:
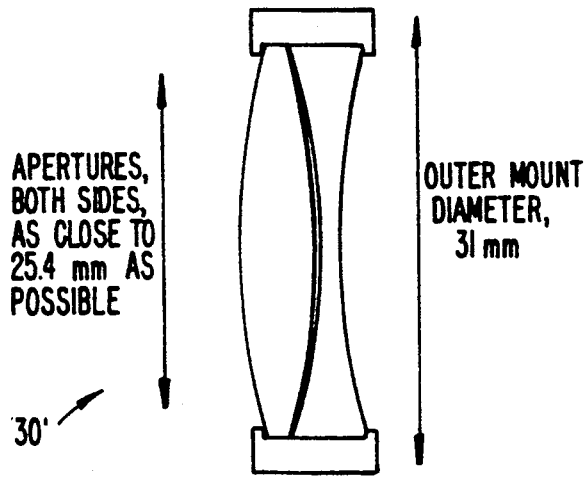

FIGS. 3 and 4 are optical schematics of a first-generation design for eyepiece 27' and UV adapter lens 30' for the inverted microscope embodiment. The geometrical and optical parameters for these lenses are set forth in Tables 1 and 2. Surfaces are numbered along the direction of the laser beams and dimensions are in mm unless otherwise stated. chromatic correction was in terms of the following design wavelengths: 330 nm, 464 nm, 560 nm, and 656 nm. The lens design was performed using the OPTEC optical systems design analysis software (PC version), available from SCIOPT Enterprises, San Jose, California.

Figure 5:
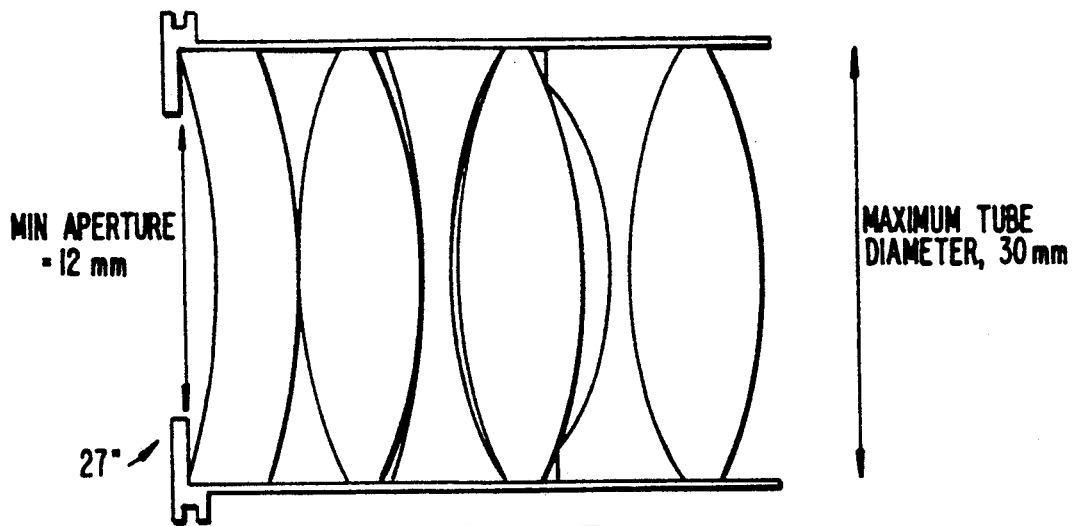
FIG. 5 is an optical schematic of a first-generation eyepiece for an upright microscope embodiment of the invention.

FIG. 5 is an optical schematic of a first-generation design for the eyepiece, designated 27'', for the upright microscope embodiment. The geometrical and optical parameters for this lens are set forth in Table 3.

The design criteria for the eyepiece (alone for the upright embodiment or in combination with the adapter lens for the inverted embodiment) can be summarized as follows. The eyepiece (or combination) is well corrected for the standard monochromatic aberrations (spherical aberration, coma, astigmatism, distortion) for each design wavelength for light traveling in both directions. As noted above, UV focus is corrected by focusing lens 65 and focusing beam expander 60, although the eyepiece (or combination) is corrected for longitudinal chromatic aberration for visible wavelengths. The eyepiece (or combination) is, however, chromatically corrected to minimize scanning errors as will be discussed below. Field curvature is minimized and matched for different colors for a visible object at infinity and a finite UV object located 195 mm from the front surface of the eyepiece. The front focal length is sufficiently long to prevent the eyepiece from touching the scanning mirror motor during adjustment.

The particular lens design was also subject to a number of more mundane constraints. For example, the glasses had to be affordable and relatively easy to manufacture into high quality lenses. Further the lens had to withstand normal laboratory temperature and humidity conditions and exposure to UV and visible laser radiation. Fused silica and calcium fluoride were chosen as the lens materials because they pass UV light, are fairly hardy under normal laboratory conditions, do not cloud with prolonged UV light exposure (under 200 mw of power), and have sufficiently different dispersion characteristics to allow chromatic corrections with reasonably attainable lens surface curvatures.

In the first-generation design, the calcium fluoride lens elements are all the same shape, being available as stock items from Janos Technology, Inc., Townshend, Vermont, at the desired quality (1% tolerances on curvature and thickness). It was believed, however, that improvements in the monochromatic aberrations could be achieved (at a cost) by relaxing the symmetry constraint on the calcium fluoride lens elements and having them custom ground. This was done in a series of second-generation designs.

Second-Generation Lens Designs

A number of second-generation designs were developed, characterized by the following differences from the first generation design. First, they are not subject to the constraint that the calcium fluoride elements be any particular shape. Second, the order of the last two elements of the eyepiece is reversed so that none of the calcium fluoride elements (which are somewhat sensitive to humidity) is exposed to the atmosphere. Along this line, the adapter lens is provided with an extra silica element to reduce chromatic aberrations and enclose the calcium fluoride element. These second-generation designs include 6.25× and 8× eyepieces and adapters (same adapter for both) for the inverted microscope embodiment, and an 8× eyepiece for the upright microscope.

Figure 6:
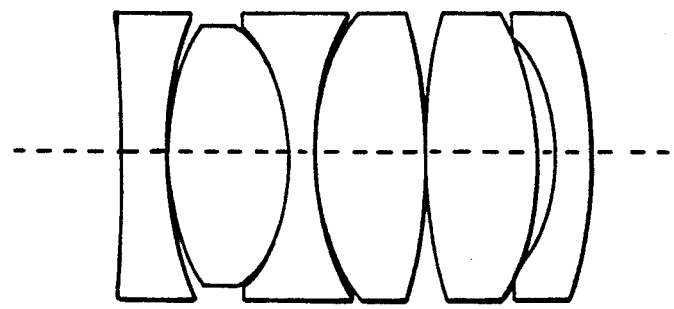
FIG. 6 is an optical schematic of a second-generation 6.25× eyepiece for the inverted microscope embodiment.

FIG. 6 is an optical schematic of the 6.25× eyepiece for the inverted microscope embodiment. The geometrical and optical parameters for this lens are set forth in Table 4. Surface 1 is the location of the scanning mirror and the front focal plane of the eyepiece. Surface 14 is the plane where the eyepiece focuses the beam, which corresponds to the front focal plane of the adapter lens (not included in Table 4 - same parameters as adapter lens for 8× eyepiece). Surfaces such as 1 and 14 are planes in air and are denoted as having a radius of 100000 mm for convenience.

Figure 7A:
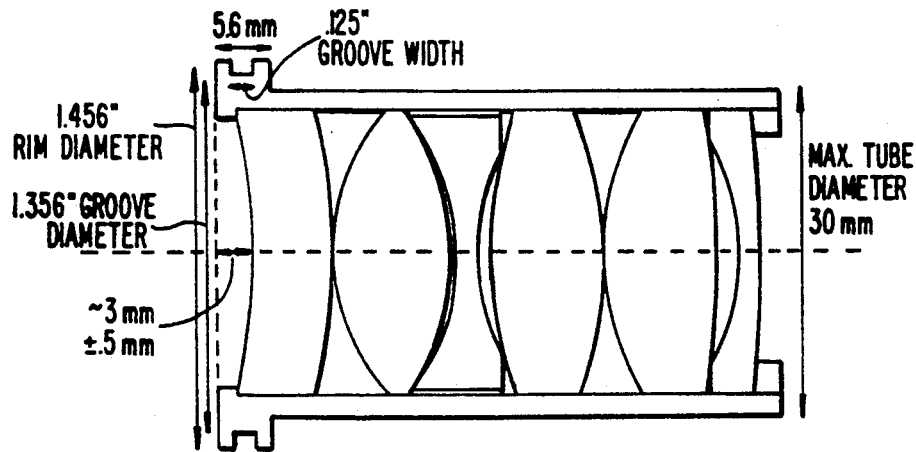
FIGS. 7A and 7B are optical schematics of a second-generation 8× eyepiece and adapter lens for the inverted microscope embodiment.
Figure 7B:
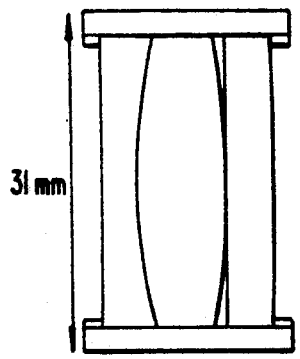

FIGS. 7A and 7B are optical schematics of the 8× eyepiece and adapter lens for the inverted microscope embodiment. The geometrical and microscope parameters for these lenses are set forth in Table 5. Surface 1 is the location of the scanning mirror and the front focal plane of the eyepiece. Surface 14 is the plane where the eyepiece focuses the beam, which corresponds to the front focal plane of the adapter lens. Surface 21 is located near the objective back aperture.

Figure 8:
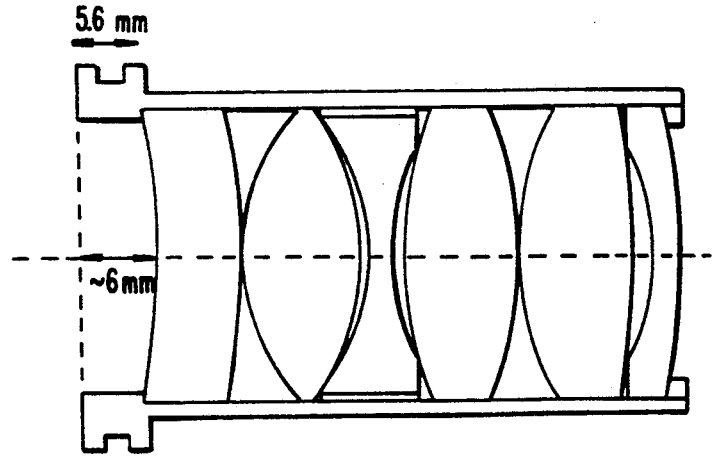
FIG. 8 is an optical schematic of a second-generation 8× eyepiece for the upright microscope embodiment.

FIG. 8 is an optical schematic of the 8× eyepiece for the upright microscope embodiment. The geometrical and microscope embodiment. The geometrical and microscope parameters for this lens are set forth in Table 6. Surface 1 is the location of the scanning mirror and the front focal plane of the eyepiece. Surface 14 is the plane where the eyepiece focuses the beam. Surface 15 is located near the objective back aperture.

Focusing Errors

FIGS. 9A-E are optical sketches showing the focusing errors caused by longitudinal chromatic aberration, as well as the way that this problem is handled.

Figure 9A:
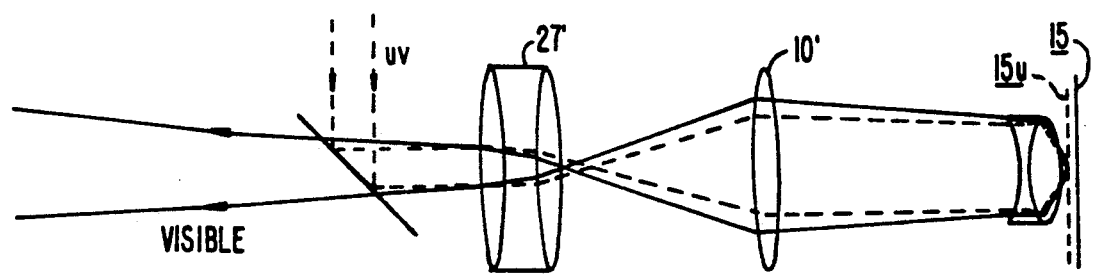
FIGS. 9A-E are optical sketches illustrating the effect and correction of focusing errors.

FIG. 9A shows how longitudinal chromatic aberration in the lenses causes focusing errors. This is illustrated in the context of the inverted microscope embodiment, but the problem and the solution are the same for the upright microscope embodiment. More particularly, an incoming collimated UV excitation beam is shown in dotted lines as coming to a focus in a plane 15u, displaced upstream from the plane 15 that an incoming beam of visible light would be focused. The visible light diverging from points inplane 15 would be collimated by the lenses and would reach the detector. However, the visible light emanating from plane 15u (where the UV beam is focused) is not collimated by the lenses on its return, and diverges before reaching the detector. As mentioned above, it is convenient to correct for longitudinal chromatic aberration through the use of focusing beam expander 60 and UV correction lens 65.

Figure 9B:
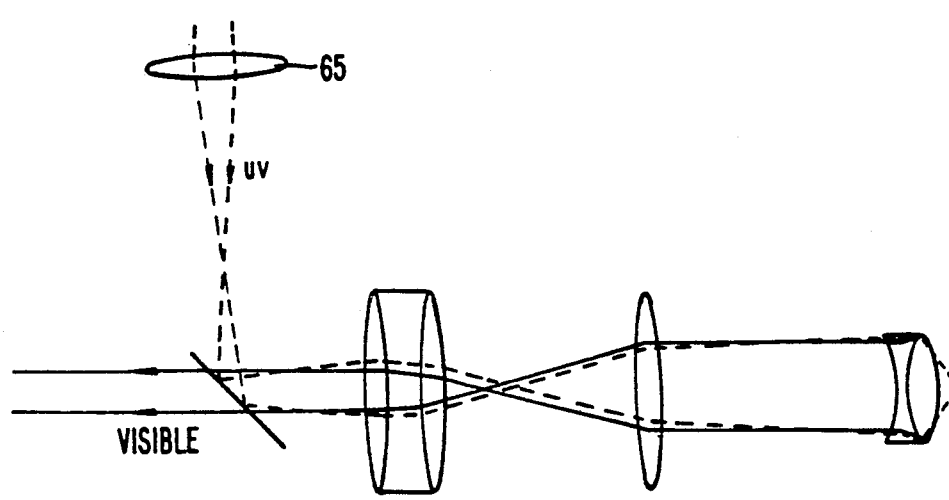

FIG. 9B shows how UV correction lens 65 causes the UV excitation beam (drawn in broken lines) to focus in the same plane 15 from which emerging visible light (drawn in solid lines) is collimated by the lenses and detected. This is accomplished by bringing the UV beam to a focus before eyepiece 27', whereupon the UV beam is diverging when it encounters the lenses. The lenses are not corrected for longitudinal chromatic aberration out to the UV, and thus the UV light is focused in plane 15. It should be noted that the illustrated visible light could equally well correspond to the visible excitation beam.

Figure 9C:
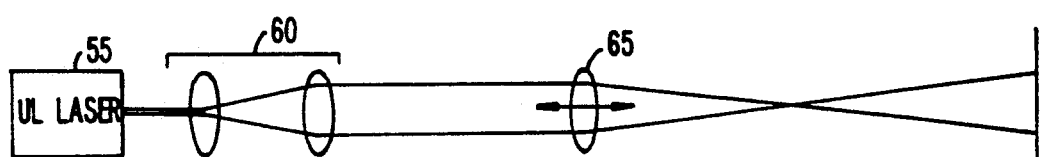
Figure 9D:
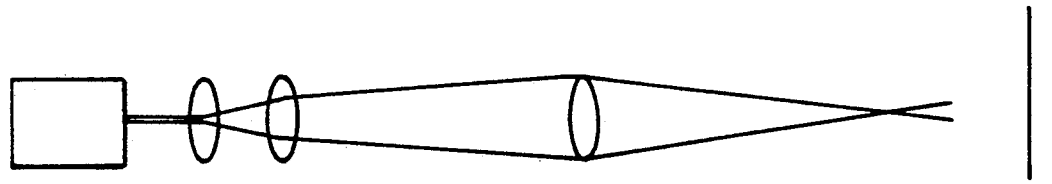
Figure 9E:
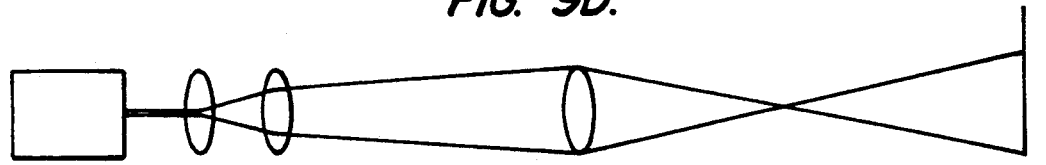

FIGS. 9C-E shown how focusing beam expander 60 and UV correction lens 65 can be adjusted to vary the position of the UV focus and increase the beam magnification to increase the filling of the back aperture of the objective. FIG. 9C shows the situation where beam expander 60 provides an expanded collimated beam. FIG. 9D shows how by adjusting the beam expander to provide a divergent beam, it is possible to change the location of the UV focal point. FIG. 9E shows how a stronger lens can be used to bring the location of the UV focus into a usable location.

Scanning Errors

Figure 10A:
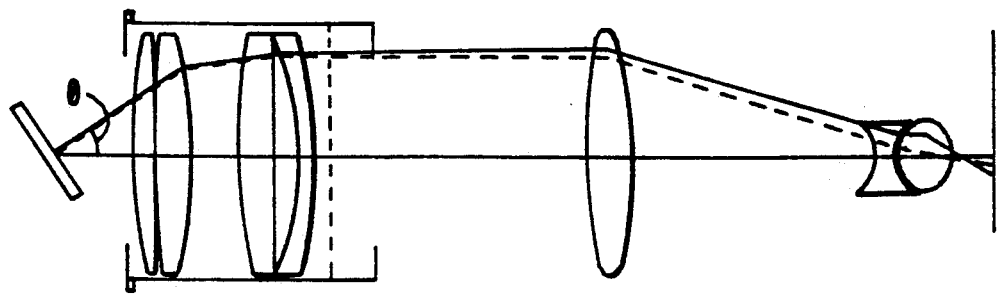
FIGS. 10A-C are optical sketches illustrating the effect and correction of scanning errors.
Figure 10B:
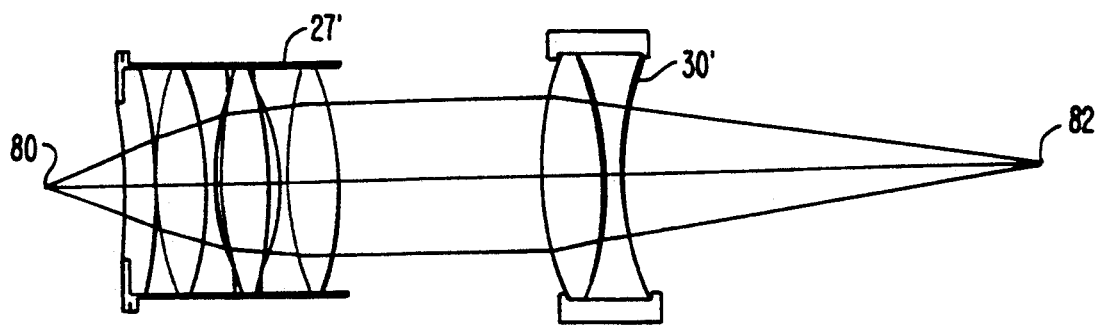
Figure 10C:
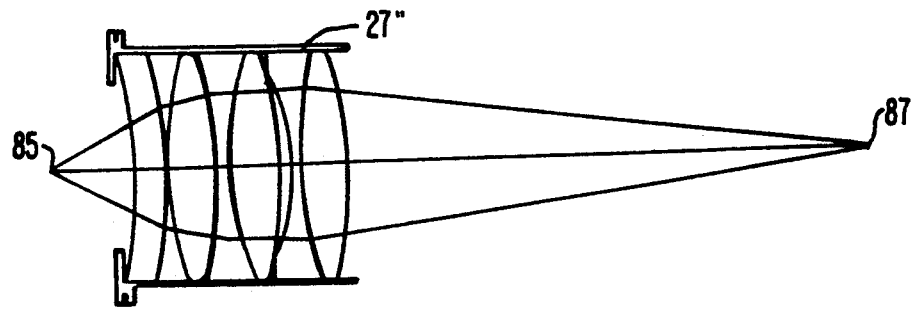

FIGS. 10A-C are optical sketches showing the scanning errors caused by chromatic effects, as well as the way that this problem is handled.

FIG. 10A shows how chromatic effects in the lenses affect confocal scanning. This problem is a separate one from longitudinal (focusing) errors, which are assumed to have been taken care of as described above. This is illustrated in the context of the inverted microscope embodiment, but the problem is the same for the upright microscope embodiment as well. For confocal operation, the returning visible light (Drawn as a solid line) resulting from UV excitation (drawn as a broken line) must travel along the same path when it encounters the scanning optics as the excitation light traveled when it left the scanning optics. As shown in the figure, this condition is met, but at large scan angles, due to chromatic effects in the lenses, the visible light is collected from a point that is laterally displaced from the point of maximal UV excitation. This type of scanning error results in a marked drop off in intensity across the image field of view.

FIG. 10B is an optical sketch showing the way that scanning errors are corrected for the inverted microscope. This is accomplished by requiring that UV and visible light from an object point 80 are focused by eyepiece 27' and adapter lens 30' at an achromatic image point 82, where the object point corresponds to the location of the last scanning mirror and the image point corresponds to a point near the center of the telonobjective combination. In the first-generation design, the object point is approximately 18 mm from the front surface of the eyepiece and the achromatic image point is 167.3 mm from the rear surface of the adapter lens. In the second generation 6.25× design, the corresponding distances are approximately 13.5 mm and 148.2 mm. In the second-generation 8× design, the corresponding distances are approximately 21.2 mm and 151.5 mm.

It is noted that this chromatic correction is not entirely compatible with a correction for longitudinal chromatic aberration, which as discussed above is instead handled by the UV correction lens and the focusing beam expander. The particular way that this optimization is implemented is as follows. The eyepiece is corrected so that (a) visible colors and UV parallel light in the backward direction focus to the same point, and (b) all colors of visible parallel light in the forward direction focus to the same plane for large and small scan angles. The adapter lens is optimized so that (a) parallel UV and visible light in the forward direction are achromatically focused at image point 82 and (b) visible parallel light traveling backward into the adapter lens is focused to a common front focal plane (located between the adapter lens and the eyepiece) for large and small scan angles. Further the system is substantially achromatic for all colors of visible light.

FIG. 10C is an optical sketch showing the way that scanning errors are corrected for the upright microscope. This is accomplished by requiring that UV and visible light from an object point 85 are focused by the eyepiece, designated 27'' at an image point 87, where the object point corresponds to the location of the last scanning mirror and the image point corresponds to a point near the center of the objective. In the first-generation design, the object point is 32 mm from the front surface of the eyepiece and the achromatic image point is 178.25 mm from the rear surface of the eyepiece. In the second-generation 8× design, the corresponding distances are approximately 27.3 mm and 160 mm.

In any given design, the different wavelengths emanating from point 80 (or 85) will not come to a focus precisely at the same point 82 (or 87), since this constraint is one of many that must be addressed in the optimization process. Thus, relative to a reference wavelength, each given wavelength will be characterized by a chromatic scan focus error, $\Delta f$, that represents the longitudinal separation between the given wavelength's focus and that for the reference wavelength.

Table 7 shows the chromatic scan focus errors ($\Delta f$) for 330 nm and 656 nm relative to the position for 494 nm (0 by definition) for four eyepieces. The first (eyepiece #1), used for comparison purposes is a four-element fused silica eyepiece optimized for monochromatic aberrations but not for scanning chromatic aberration. The other three are the 6.5× first-generation eyepiece and the 6.25× and 8× second-generation eyepieces, all for the inverted microscope.

Each eyepiece design was combined with a 160 mm lens design in the OPTEC program, and rays of different wavelengths were traced along scan lines through the optics. The chromatic scan focus error ($\Delta f$) was determined using the 494 nm reference wavelength. $\Delta f$ was more than one inch at UV wavelengths with the uncorrected fused silica eyepiece, and was reduced to a few millimeters with the eyepieces corrected according to the invention. Table 8 shows $\Delta f$ for additional wavelengths with the 6.25× eyepiece.

Thin lens equations predict that, for maximum resolution, an 8× eyepiece will require 25% less chromatic correction than that required by the 6× eyepiece. However, chromatic error was more than halved by designing a longer focal length 6.5× eyepiece (compare eyepieces #2 and #3 in Table 8). The 8× design required stronger surface curvatures to achieve the same chromatic correction as the 6×, increasing monochromatic aberrations to unacceptably large values. Therefore, the chromatic correction was necessarily reduced for the 8× eyepiece. Eyepiece #3 (6.5×) had the least amount of chromatic aberration but was flawed by significant distortion and was redesigned to yield eyepiece #4 (6.25×). For eyepiece #4, the chromatic correction was compromised to optimize the monochromatic corrections.

The correction for chromatic scan focus errors appears to be accomplished primarily in the eyepiece, even in the inverted microscope embodiment. Indeed, some tests indicated that an off-the-shelf 160 mm visible achromat that also transmitted UV worked somewhat better than the first-generation adapter lens, and generally as well as the second-generation adapter lens.

Field Curvature and Magnification Errors

Field curvature is typically one of the hardest aberrations to correct, and a certain residual amount is often acceptable. For example, assuming that all wavelengths are subject to the same degree of field curvature, the result would be that the sample plane would not be a plane, but rather a slightly curved surface. Fundamentally this would not be a problem since slightly curved sections would generally provide the same useful information as perfectly flat ones.

However, the real problem arises when all wavelengths are not subject to the same degree of field curvature. In such a case, for points removed from the center of the field, the UV excitation would not be confocal with the visible fluorescence. Rather, the visible light reaching the detector would be that emanating from a point away from the focused beam spot and would thus be of much lower intensity. This is the same problem that arises if longitudinal focusing errors are not corrected except that the result is not uniform across the field, but increases away from the center of the field.

Accordingly, the problem is handled by accepting some degree of field curvature and placing a priority on achieving a field that is similarly shaped for the UV and visible wavelengths.

Figure 11:
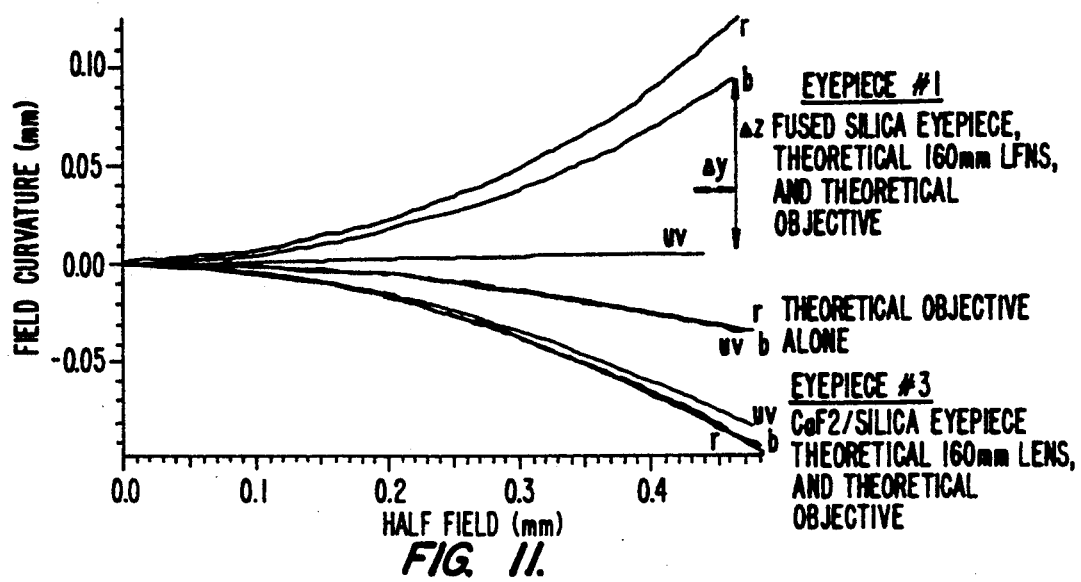
FIG. 11 shows plots illustrating the effect and correction of field curvature.

FIG. 11 shows calculated plots of field curvature for eyepiece #1 (top three lines) and eyepiece #3 (bottom three lines), each combined with a theoretical 160 mm adapter lens and a theoretical objective. Also shown are plots for the objective alone (three almost coincident lines). Field curvature at the specimen plane was calculated by tracing rays of light at incremented scan angles through theoretical thick-lens models (using the OPTEC program). As the scan angle was incremented, the root-mean-square position of the objective focus was recorded in the axial and radial directions, and plotted. To model the full optical train, a theoretical infinity-corrected, 10× objective (achromatic in visible but with some residual chromatic aberration in UV) was designed from calcium fluoride and fused silica. A 160mm lens with similar chromatic properties was also designed. Rays were traced through the optical system at three wavelengths: red (656 nm), blue (488 nm), and uv (330 nm). Chromatic corrections in the calcium fluoride/fused silica eyepiece dramatically reduced lateral magnification errors, $\Delta y$, as well as field curvature errors, $\Delta z$, compared to errors introduced by the uncorrected fused silica eyepiece.

FIGS. 12A–C are plots showing calculated field curvature and magnification errors near the edge of the field of view for the microscope with a 100× objective, a 40× objective, and a 10× objective. The vertical axis represents the location of the spot along the beam direction. The horizontal axis represents the transverse position of the spot. The three rows of plus signs represent measurements taken with red (top), blue, and UV (bottom) for the four-element fused silica objective. Measurements for each of the three wavelengths at a particular scan angle are grouped. The vertical separation between points represents a field curvature error between wavelengths at that angle; the horizontal separation represents a magnification error.

The four rows of diamonds represent measurements taken with the corrected six-element 6.5× eyepiece for UV (top) and red, blue, and green (grouped below). As can be seen, the field curvature and magnification errors are much smaller for the corrected eyepiece. The magnification errors dominate the field curvature errors for the 100× objective, while the reverse is true for the 10× objective. The errors are comparable for the 40× objective.

Overall Intensity Profile

Figure 13A:
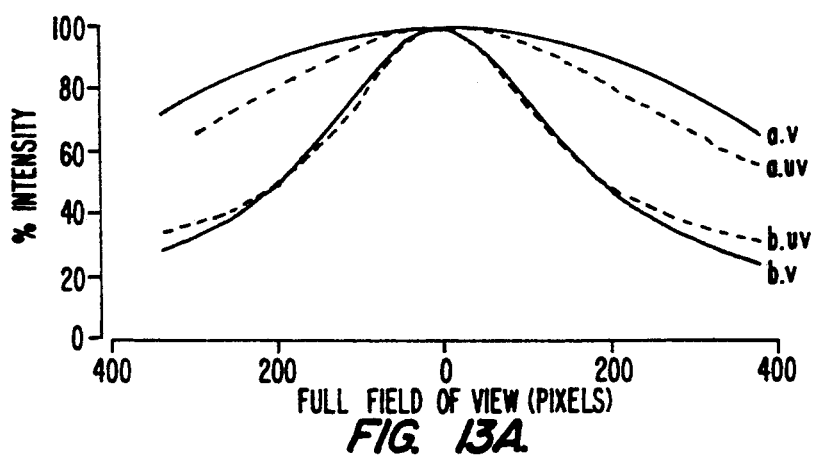
FIG. 13A and 13B show plots of intensity across the field.
Figure 13B:
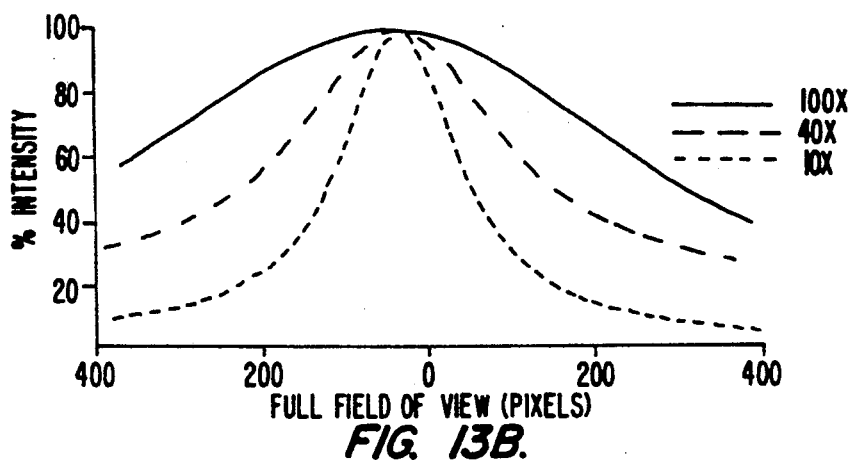

Confocal sections were collected through the center of a thick slab of fluorescein dye, excited by blue or UV light, using a 40× Olympus objective. Curves were fit to a profile of the fluorescent image, drawn through the center of the field. The curves were shifted slightly to match their peaks. (Peak-shifting was caused by small mirror alignment differences). A full field-of-view was 768 pixels. FIG. 13A shows the fluorescent field brightness with UV or visible excitation for chromatically-corrected eyepiece #3 (curves a.v and a.uv), and chromatically-uncorrected eyepiece #1 (curves b.v and b.uv,). As can be seen, image intensity across the field was dramatically improved with the chromatically corrected eyepiece. FIG. 13B shows data collected using eyepiece #1 and 100×, 40×, and 10× Olympus objectives. As can be seen, field intensity improved with increasing objective power.

Focusing Lens in Detector Path

As alluded to above, collection efficiency may be improved by placing a lens in the detector path. Collimated excitation laser light passes through the eyepiece and objective, and focuses to an excitation point. Fluorophores are excited in the region around the excitation point according to the intensity distribution of a diffraction-limited, three-dimensional point spread function (psf). Light is collected by the objective along this same intensity profile, resulting in a somewhat narrower confocal psf that is approximately symmetrical around the excitation point. In a simple pinhole confocal microscope the center of the psf image is focused to the pinhole, and light from planes above and below the objective focus is rejected nearly symmetrically. In the particular microscope described above, light from the center of the psf image is focused to infinity, and consequently, light from planes above and below the objective focus is rejected asymmetrically.

The radius of the beam at the confocal aperture was calculated for light emitted from various points along the optical axis near the excitation point using thin lens equations. The proportion of the intensity collected from each point was calculated for the aperture set to the width of the collimated beam according to $I = (rp/r\Delta)2$, where rp, the radius of the pinhole, was set to the radius of the collimated beam from the excitation point, and $r\Delta$ was the radius of the diverging or converging light at the pinhole from out-of-focus points. Values greater than 1 were truncated to 1 (indicating all of the light was collected at the PMT). The center of the resulting pinhole collection function (pcf) was found to be shifted past the center of the psf along the optical axis. As the pinhole was opened or closed, the pcf widened or narrowed around its center. The beam of light from the center of the pcf was focused on the pinhole. For a 40× objective, the optical section, when using a 6× eyepiece, was found to be more than twice as wide as the section from a 10× eyepiece when all the light from the maximally excited point at the center of the psf is collected.

The pinhole can also be thought of as a spatial sampling device. To obtain theoretical resolution, the pcf must be at least half the width of the theoretical resolution to satisfy the Nyquist sampling criterion. The pcf generally has a different shape than the psf, with the result that a smaller pinhole must be used to attain maximum resolution in the radial direction than in the axial direction. If the pinhole size is reduced to attain theoretical axial resolution, the pcf will narrow around its center, and a large portion of the excited light from the psf will be rejected.

Thin lens equations were used to calculate the magnification of the psf in the radial direction at the pinhole. The theoretical lateral resolution was found to be attainable with a 10× eyepiece but not with a 6× eyepiece in this configuration. Similar calculations were made for 100×, 40×, 20×, and 10× objectives with 6×, 8×, and 10× eyepieces.

The model 10× eyepiece could attain theoretical axial and radial resolution (although not with optimal power) for all but the 10× objective. The 8× eyepiece resolving power was marginal for the 40× objective, and was insufficient for the 10× objective. The 6× eyepiece only attained theoretical resolution with the 100× objective.

To solve this resolution problem, a 1000 mm lens was placed between the dichroic mirror and the pinhole to focus collimated light from the center of the excitation spot to the pinhole. This approach shifted the center of the axial pcf to the center of the axial psf, allowing the pinhole to be reduced to any size and yet still collect light from the maximally excited point in the specimen.

At small apertures, the use of the long lens boosts the light intensity collected by about 40%. Collecting the out-of-focus light is not as much of a problem as rejecting some of the in-focus light because the aperture is smaller than the width of the returning collimated beam. The final effect is to increase the light intensity at small apertures while maintaining or boosting resolution. Due to the basic microscope design, which includes the eyepiece and long return path, the benefit of using an iris diaphragm instead of a pinhole is retained even when the long lens is inserted into the return-only path.

However, the single lens reduced the lateral magnification of the psf FWHM at the pinhole below 0.5 mm (a practical limit for the variable aperture) with some objective/eyepiece combinations. The single lens was subsequently replaced with a two lens optic designed to focus the psf image to the aperture, and magnify the lateral FWHM of the image to a size greater than 0.5 mm for all objectives. This design is expected to allow the chromatically corrected 6× eyepiece design to be used to attain theoretical confocal resolution.

Conclusion

In conclusion it can be seen that the present invention provides an economical and effective technique for extending the advantages of confocal scanning microscopy into the UV.

While the above is a full description of the preferred embodiments, various modifications, alternative constructions, and equivalents may be used. For example, while the return-only path is shown as being provided with a single beam splitter and two detectors, a second beam splitter and a third detector could be added to exploit more fully the UV capability of the microscope. Furthermore, while the objective in the inverted microscope embodiment was shown in combination with a telon lens, an infinity-corrected objective without a telon lens could be used.

Therefore, the above description and illustrations should not be taken as limiting the scope of the present invention which is defined by the appended claims.

TABLE 1

FIRST-GENERATION EYEPIECE FOR INVERTED MICROSCOPE

| Surface | Radius | Center Thickness | Material | Maximum Aperture | Edge Thickness |
|---|---|---|---|---|---|
| 1 | −66.331 | 7.00 | silica | 25.4 | 5.467 |
| 2 | −30.597 | 0.00 | air | 25.4 | 6.532 |
| 3 | 23.266 | 9.54 | CaF2 | 25.4 | 1.996 |
| 4 | −23.266 | 0.00 | air | 25.4 | 0.958 |
| 5 | −30.070 | 2.00 | silica | 25.4 | 7.509 |

TABLE 1-continued
FIRST-GENERATION EYEPIECE FOR INVERTED MICROSCOPE

| Surface | Radius | Center Thickness | Material | Maximum Aperture | Edge Thickness |
|---|---|---|---|---|---|
| 6 | 15.388 | 1.00 | air | 17.4 | 2.077 |
| 7 | 23.266 | 9.54 | CaF2 | 25.4 | 1.996 |
| 8 | −23.266 | 1.50 | air | 25.4 | 1.186 |
| 9 | −16.052 | 1.50 | silica | 21.4 | 8.942 |
| 10 | 25.710 | 0.00 | air | 25.4 | 0.416 |
| 11 | 23.266 | 9.54 | CaF2 | 25.4 | 1.996 |
| 12 | −23.266 | | | | |

EFL = 38.59 mm  FFL = 22.4 mm
Distance from scanning mirror to surface #1 = 18 mm
Magnification = 250/38.59 = 6.5x
Minimum aperture = 12 mm
Maximum tube diameter = 30 mm

TABLE 2
FIRST-GENERATION ADAPTER LENS FOR INVERTED MICROSCOPE

| Surface | Radius | Center Thickness | Material | Maximum Aperture | Edge Thickness |
|---|---|---|---|---|---|
| 1 | 37.211 | 6.40 | CaF2 | 25.4 | 1.931 |
| 2 | −37.211 | 0.134 | air | 25.4 | 0.00 |
| 3 | −37.259 | 2.50 | silica | 25.4 | 5.548 |
| 4 | 120.112 | | | | |

EFL = 134.4 mm  FFL = 137.3 mm  BFL = 123.5 mm
Distance from eyepiece to surface #1 = 155.30 mm
Distance from surface #4 to telon lens = 167.30 mm

TABLE 3
FIRST-GENERATION EYEPIECE FOR UPRIGHT MICROSCOPE

| Surface | Radius | Center Thickness | Material | Maximum Aperture | Edge Thickness |
|---|---|---|---|---|---|
| 1 | −90.609 | 7.00 | silica | 25.4 | 5.467 |
| 2 | −41.788 | 0.00 | air | 25.4 | 6.532 |
| 3 | 23.266 | 9.54 | CaF2 | 25.4 | 1.996 |
| 4 | −23.266 | 0.00 | air | 25.4 | 0.958 |
| 5 | −28.449 | 2.00 | silica | 25.4 | 7.509 |
| 6 | 19.287 | 1.00 | air | 17.4 | 2.077 |
| 7 | 23.266 | 9.54 | CaF2 | 25.4 | 1.996 |
| 8 | −23.266 | 1.50 | air | 25.4 | 1.186 |
| 9 | −16.113 | 1.50 | silica | 21.4 | 8.942 |
| 10 | 22.175 | 0.00 | air | 25.4 | 0.416 |
| 11 | 23.266 | 9.54 | CaF2 | 25.4 | 1.996 |
| 12 | −23.266 | | | | |

EFL = 38.82 mm  FFL = 22.75 mm  BFL = 18.24 mm
Distance from scanning mirror to surface #1 = 32 mm
Distance from surface #12 to objective = 178.25 mm
Magnification = 250/38.82 = 6.4
Minimum aperture = 12 mm
Maximum tube diameter = 30 mm

TABLE 4
SECOND-GENERATION 6.25X EYEPIECE FOR INVERTED MICROSCOPE

| Surface | Radius | Center Thickness | Material | Maximum Aperture | Edge Thickness |
|---|---|---|---|---|---|
| 1 | 100000.000 | 23.805 | air | 25.4 | 23.652 |
| 2 | −527.977 | 4.000 | silica | 25.4 | 6.475 |
| 3 | 35.895 | 0.000 | air | 25.4 | 0.686 |
| 4 | 23.490 | 10.500 | CaF2 | 23.0 | 3.020 |
| 5 | −17.021 | 0.000 | air | 23.0 | 0.466 |
| 6 | −18.510 | 2.000 | silica | 23.0 | 9.262 |
| 7 | 26.400 | 0.000 | air | 25.4 | 0.682 |
| 8 | 22.449 | 9.540 | CaF2 | 25.4 | 3.991 |
| 9 | −50.869 | 0.000 | air | 25.4 | 3.386 |
| 10 | 46.320 | 9.540 | CaF2 | 25.4 | 4.596 |
| 11 | −27.035 | 1.500 | air | 25.4 | 0.965 |
| 12 | −17.279 | 3.000 | silica | 21.4 | 4.584 |
| 13 | −39.099 | 25.615 | air | 25.4 | 27.735 |
| 14 | 100000.000 | | | | |

TABLE 5
SECOND-GENERATION 8X EYEPIECE AND ADAPTER FOR INVERTED MICROSCOPE

| Surface | Radius | Center Thickness | Material | Maximum Aperture | Edge Thickness |
|---|---|---|---|---|---|
| 1 | 100000.000 | 21.201 | air | 25.4 | 19.943 |
| 2 | −64.724 | 7.000 | silica | 25.4 | 6.800 |
| 3 | −56.024 | 0.000 | air | 25.4 | 6.458 |
| 4 | 18.630 | 10.000 | CaF2 | 25.4 | 1.127 |
| 5 | −22.758 | 0.440 | air | 25.4 | 0.109 |
| 6 | −20.660 | 2.000 | silica | 25.4 | 8.352 |
| 7 | 20.517 | 1.000 | air | 17.6 | 1.096 |
| 8 | 39.746 | 9.540 | CaF2 | 25.4 | 4.981 |
| 9 | −33.820 | 0.000 | air | 25.4 | 5.754 |
| 10 | 26.229 | 9.540 | CaF2 | 25.4 | 5.138 |
| 11 | −72.437 | 1.700 | air | 25.4 | 0.409 |
| 12 | −22.471 | 2.000 | silica | 20.3 | 3.628 |
| 13 | −103.178 | 12.021 | air | 25.4 | 12.806 |
| 14 | 100000.000 | 148.896 | air | 25.4 | 149.199 |
| 15 | 405.219 | 3.000 | silica | 25.4 | 4.336 |
| 16 | 53.314 | 0.063 | air | 25.4 | 0.000 |
| 17 | 55.550 | 7.000 | CaF2 | 25.4 | 4.545 |
| 18 | −82.494 | 0.000 | air | 25.4 | 1.032 |
| 19 | 1672.767 | 4.000 | silica | 25.4 | 4.052 |
| 20 | −805.477 | 151.452 | air | 25.4 | 151.352 |
| 21 | 100000.000 | | | | |

TABLE 6
SECOND-GENERATION 8X EYEPIECE FOR UPRIGHT MICROSCOPE

| Surface | Radius | Center Thickness | Material | Maximum Aperture | Edge Thickness |
|---|---|---|---|---|---|
| 1 | 100000.000 | 27.290 | air | 25.4 | 26.213 |
| 2 | −69.162 | 7.000 | silica | 25.4 | 6.908 |
| 3 | −64.215 | 0.000 | air | 25.4 | 6.268 |
| 4 | 18.630 | 10.000 | CaF2 | 25.4 | 1.127 |
| 5 | −22.758 | 0.600 | air | 25.4 | 0.371 |
| 6 | −19.983 | 2.000 | silica | 25.4 | 8.212 |
| 7 | 21.556 | 1.000 | air | 18.6 | 0.974 |
| 8 | 39.746 | 9.540 | CaF2 | 25.4 | 4.981 |
| 9 | −33.820 | 0.000 | air | 25.4 | 5.755 |
| 10 | 26.229 | 9.540 | CaF2 | 25.4 | 5.138 |
| 11 | −72.437 | 1.700 | air | 25.4 | 0.447 |
| 12 | −21.655 | 2.000 | silica | 19.7 | 3.341 |
| 13 | −78.532 | 12.180 | air | 25.4 | 13.215 |
| 14 | 100000.000 | 160.000 | air | 25.4 | 0 |
| 15 | 100000.000 | | | | |

TABLE 7
SCANNING CHROMATIC ERROR (Δf) FOR FOUR EYEPIECES

| Wavelength (nm) | Silica Eyepiece #1 Δf (mm) | 8x Eyepiece #2 Δf (mm) | 6.5x Eyepiece #3 Δf (mm) | 6.25x Eyepiece #4 Δf (mm) |
|---|---|---|---|---|
| 330 | −29.77 | −9.09 | −3.28 | −4.22 |
| 494 | 0 | 0 | 0 | 0 |
| 656 | 9.53 | 1.38 | −0.76 | −0.21 |

TABLE 8
SCANNING CHROMATIC ERROR FOR 6.25x EYEPIECE

| Wavelength (nm) | Δf (mm) |
|---|---|
| 656 | −0.21 |
| 540 | 0.13 |
| 494 | 0 |
| 488 | −0.05 |
| 450 | −1.01 |
| 351 | −3.19 |
| 330 | −4.22 |

What is claimed is:
1. A scanning confocal microscope comprising:
UV source means for providing a UV beam;

a visible light detector means for limiting the effective size of said detector;

means for directing said UV beams along a forward path from said UV source means to a sample region, said forward path including first and second segments;

means for directing visible light along a return path from said sample region to said visible detector, said return path including said second segment and a third segment;

focusing means in said second segment for focusing said UV beam to a spot in said sample region; and scanning means in said second segment for varying the angle at which said UV beam encounters said focusing means so as to vary the location of said spot in said sample region;

said focusing means being corrected for chromatic scanning errors so that where UV light leaves said scanning means at a given angle and is focused at a given location in said sample region, visible light emanating from the given location encounters said scanning means at the same given angle.

2. The scanning confocal microscope of claim 1 wherein:

said focusing means is not longitudinally achromatic between visible and UV light;

visible light originating from said spot is collimated on leaving said focusing means; and said first segment includes means disposed therein for causing said UV beam to be diverging when it encounters said focusing means.

3. The scanning confocal microscope of claim 1 wherein said focusing means comprises an eyepiece and an objective.

4. The scanning confocal microscope of claim 1 wherein said focusing means comprises an eyepiece, an adapter lens, a telon lens, and an objective.

5. The scanning confocal microscope of claim 1 wherein said means for limiting the effective size of said detector comprises an iris diaphragm.

6. The confocal microscope of claim 1 wherein a first portion of said focusing means is chromatically corrected for visible and UV light between a finite object point and a finite image point.

7. The confocal microscope of claim 6 wherein said finite object point is approximately at a point where said UV beam leaves said scanning means.

8. The scanning confocal microscope of claim 1, and further comprising a visible source that is confocal with said UV source means.

9. The scanning confocal microscope of claim 1 wherein:

said focusing means is not longitudinally achromatic between visible and UV light; and said first segment includes means disposed therein for compensating for longitudinal chromatic aberration between visible and UV light.

10. A scanning confocal microscope comprising:

a UV illumination subsystem for directing a UV beam along a forward path to a sample region;

a visible light subsystem for detecting visible light travelling along a return path from said sample region;

said UV illumination subsystem and said visible light subsystems having shared elements including a beam scanner and focusing optics;

said focusing optics operating to focus said UV beam to a spot in said sample region and to collect visible light emanating from said spot;

said beam scanner operating to vary the location of said spot in said sample region;

said focusing optics being corrected for chromatic scanning errors so that where UV light leaves said bean scanner at a given angle and is focused at a given location in said sample region, visible light emanating from the given location encounters said beam scanner at substantially the same given angle.

11. The scanning confocal microscope of claim 10 wherein said focusing optics comprises an eyepiece and an objective.

12. The scanning confocal microscope of claim 11 wherein said eyepiece is chromatically corrected for visible and UV light between a finite object point and a finite image point.

13. The confocal microscope of claim 12 wherein said finite object point is approximately at a point where said UV beam leaves said beam scanner.

14. The scanning confocal microscope of claim 10 wherein said focusing optics comprises an eyepiece, an adapter lens, a telon lens, and an objective.

15. The confocal microscope of claim 14 wherein said eyepiece and adapter lens are chromatically corrected for visible and UV light between a finite object point and a finite image point.

16. The confocal microscope of claim 15 wherein said finite object point is approximately at a point where said UV beam leaves said beam scanner.

17. The scanning confocal microscope of claim 9 wherein said visible light subsystem includes a visible detector and an iris diaphragm.

18. The scanning confocal microscope of claim 9 wherein:

said focusing optics is not longitudinally achromatic between visible and UV light; and said UV subsystem includes at least one lens, not shared with said visible subsystem, to compensate for longitudinal chromatic aberration between visible and UV light.

* * * * *